United States Patent [19]

Parks, Jr.

[11] Patent Number: 5,135,032

[45] Date of Patent: Aug. 4, 1992

[54] SLURRY GATE VALVE

[75] Inventor: Glenn C. Parks, Jr., Houston, Tex.

[73] Assignee: Foster Valve Corporation, Houston, Tex.

[21] Appl. No.: 744,771

[22] Filed: Aug. 14, 1991

[51] Int. Cl.$^5$ .................................... F16K 3/02
[52] U.S. Cl. ....................... 137/630.22; 137/614.13; 251/210; 251/297
[58] Field of Search ............... 251/210, 297; 137/630.22, 614.11, 614.13, 614.21, 614.18

[56] References Cited

U.S. PATENT DOCUMENTS

| 4,250 | 1/1871 | Ludlow | 251/204 |
|---|---|---|---|
| 33,309 | 9/1861 | Ludlow | 251/204 |
| 139,339 | 5/1873 | Spaulding | 251/195 |
| 559,926 | 5/1896 | Baker | 251/195 |
| 994,587 | 6/1911 | Hartzell | 137/630.12 |
| 1,084,909 | 1/1914 | Stepanian | 137/614.13 |
| 1,722,815 | 7/1929 | Meakin | 137/614.11 |
| 1,984,741 | 12/1934 | Harrington | 251/210 |
| 3,314,442 | 4/1967 | Volpin | 251/197 |
| 3,397,862 | 8/1968 | Batzer et al. | 251/204 |
| 4,052,036 | 10/1977 | Schertler et al. | 251/144 |
| 4,081,175 | 3/1978 | Hasbrouck | 251/327 |
| 4,279,404 | 7/1981 | Levin | 251/167 |
| 4,291,861 | 9/1981 | Faria | 251/158 |
| 4,405,113 | 9/1983 | Erwin | 251/168 |
| 4,408,634 | 10/1983 | Peacock | 137/630.12 |
| 4,480,659 | 11/1984 | Peacock | 137/630.12 |
| 4,495,966 | 1/1985 | Longamore | 137/614.01 |
| 4,560,141 | 12/1985 | Bosch | 251/167 |
| 4,595,031 | 6/1986 | Arens et al. | 251/195 |
| 4,612,983 | 9/1986 | Karr, Jr. | 166/55 |

FOREIGN PATENT DOCUMENTS 699 of 1926 Australia ................... 137/630.22

Primary Examiner—A. Michael Chambers
Attorney, Agent, or Firm—Edgar A. Zarins; Malcolm L. Sutherland

[57] ABSTRACT

A slurry gate valve incorporating dual gates for the positive interruption of fluid flow through a pipeline associated with the valve. The dual gate valve is movable through three positions: a fully open position, a half open position, and a full closed position. The valve includes a main leader gate and a follower gate each having selectively alignable fluid passageways. An interlock mechanism selectively connects the dual gates for simultaneous travel once the gates have reached the half open position. The dual action gate valve reduces wear on the downstream resilient seals associated with the valve by shielding the seal against the fluid flow through the main passageway of the valve.

20 Claims, 3 Drawing Sheets

SLURRY GATE VALVE

BACKGROUND OF THE INVENTION

I. Field of the Invention

This invention relates to gate valves for the control of fluid flow through a pipeline and, in particular, to a dual gate valve incorporating a main gate and a follower gate for the controlled interruption of flow thereby reducing wear on the seals associated with the valve.

II. Description of the Prior Art

Gate valves for the control and interruption of fluid flow are widely utilized in the petroleum services area. Typically, these prior known gate valves incorporate a movable gate having a throughbore formed therein which can be moved into and out of alignment with the pipeline passageway using well known manipulation mechanisms. An elastomeric or metal-to-metal seal seated within the main passageway engages the gate to direct fluid flow through the gate. Due to the abrasive fluid flow through the valve, particularly when the gate is partially open, the seals can be damaged requiring replacement. The problem is exacerbated in valves used to control the flow of slurry fluids which contain a higher concentration of abrasive fluids.

SUMMARY OF THE PRESENT INVENTION

The present invention overcomes the disadvantages of the prior known gate valves by incorporating dual gates which sequentially open to open the fluid passageway such that the gate seals are shielded from the abrasive fluid flowing therethrough.

The gate valve of the present invention includes a housing having a fluid passageway therethrough and flanges for mounting the valve in the pipeline. The valve has mechanical means for manipulating a gate assembly within the housing for interrupting and instigating fluid flow through the valve and pipe line. The gate assembly comprises a main leader gate and a follower gate which are selectively interconnected for sliding sequential operation. Each gate includes a throughbore which may be selectively aligned to permit fluid flow. An interlock assembly carried by the follower gate selectively interlocks the two gates for simultaneous movement of certain positions.

Beginning in the full closed position, the interlock connects the dual gates for simultaneous movement. As the gates move to the "half" open position, the bore of the follower gate aligns with the fluid passageway while the main gate continues to block fluid flow. The interlock assembly engages a fixed stop to disengage the interlock allowing the main gate to move independently of the follower gate. As the passageway is opened the downstream seals will be shielded from the force of the fluid flow by the follower gate. Finally, the main gate moves to the full open position allowing full fluid flow through the valve. To close the valve the sequence is reversed again shielding the seals from the erosive fluid flow.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
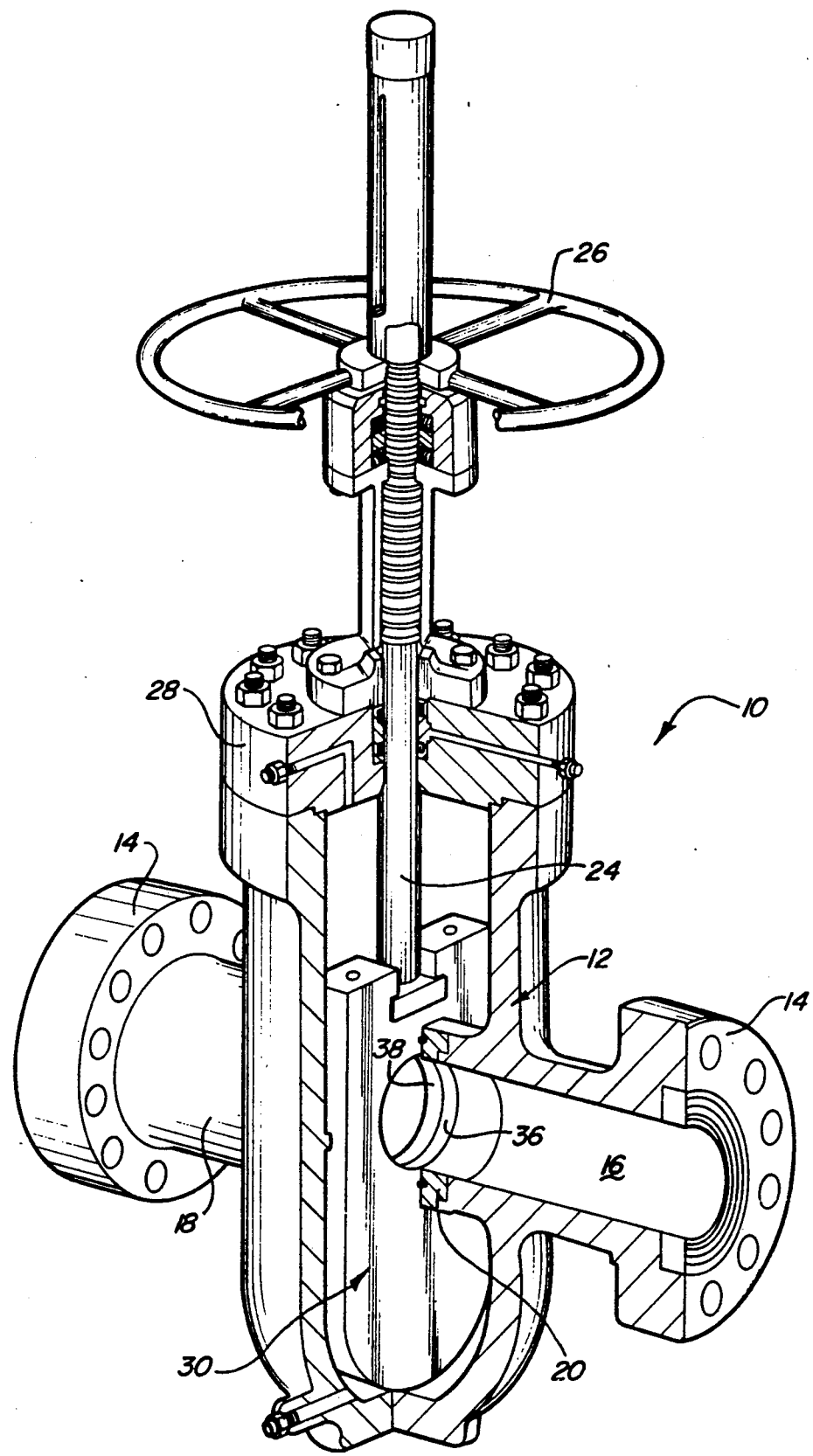
FIG. 1 is an elevated perspective of a gate valve partially in cross-section and incorporating the dual gate assembly of the present invention.

Referring first to Figure there is shown a gate valve 10 embodying the present invention and adapted to be disposed within a pipeline for control of fluid flow. The gate valve 10 includes a valve housing 12 having a pair of flanged connectors 14 for securing the valve 10 within the pipeline and which form an inlet fluid passageway 16 and an outlet fluid passageway 18. Seated within each of the fluid passageways 16 and 18 are seals consisting of an upstream seal 20 and a downstream seal 22, respectively. In a preferred embodiment, the upstream seal 20 seated in the inlet passageway 16 is a metal-to-metal seat while the downstream seal 22 seated in the outlet passageway 18 is a resilient seal and metal-to-metal seat. Movably disposed between the passageways 16 and 18 to control fluid flow is a gate assembly 30 embodying the present invention. The gate assembly 30 cooperates with the seals 20 and 22 to control fluid flow through the valve 10. The gate assembly 30 is manipulated between open and closed positions through a stem 24 threadably connected to a control wheel 26 mounted to a housing cap 28. Of course, alternative means of manipulating the gate assembly 30 could be used. Thus, the gate valve 10 of the present invention controls the flow of fluid through a pipeline by interrupting the flow from the inlet passageway 16 to the outlet passageway 18 and is particularly suited for withstanding the erosive forces of slurry fluids as will be subsequently described.

Referring now to FIGS. 2 through 6, the gate assembly 30 is shown in greater detail. The gate assembly 30 is disposed intermediate the seals 20 and 2 in the fluid passageways 16 and 18 respectively. The gate assembly 30 maintains seating contact with the seals 20 and 22 in order to direct fluid flow through the gate valve 10 and to prevent flow around the gate assembly 30. In a preferred embodiment of the present invention, the gate assembly 30 comprises a lead gate 32 which is connected to the shaft 24 and a follower gate 34 in flush engagement with the lead gate 32. The lead gate 32 includes a throughbore 36 and the follower gate 34 includes throughbore 38, both of which are selectively movable into axial alignment with the fluid passageways 16 and 18 to permit fluid flow through the gate valve 10. The gates 32 and 34 are sequentially movable to control fluid flow through the gate valve 10, however, the sequence of deployment ensures that the downstream seal 22 will be shielded from the flow of fluid through the gate valve 10 as will be subsequently described. This is particularly advantageous when dealing with slurry fluids having a large abrasive content which can reduce the life of the seals 22.

Figure 6:
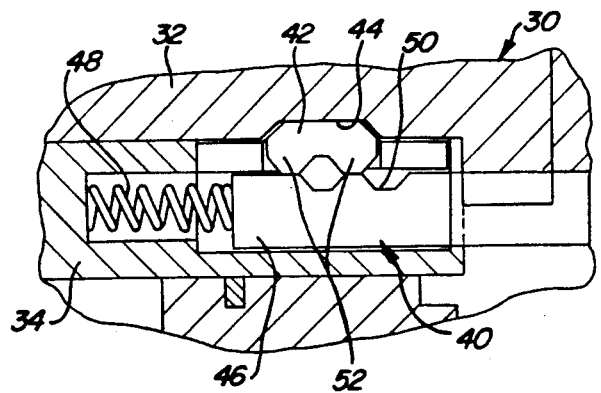
FIG. 6 is an enlarged perspective of the interlock mechanism.

Although independently slidable the gates 32 and 34 are interconnected over at least a portion of their travel by a selectively engageable interlock mechanism 40. Preferably, the interlock mechanism 40 is disposed within the follower gate 34 for engagement with the lead gate 32. As is best shown in FIG. 6, the interlock mechanism 40 includes a chuck 42 selectively engageable with the lead gate 32. A groove 44 may be provided in the lead gate 32 which receives the chuck 42. The chuck 42 is driven into engagement with the lead gate 32 by a block 46 which is biased by a spring 48 towards the engaged position (FIG. 6). The block 46 includes grooves 50 adapted to receive teeth 52 on the chuck 42 in the disengaged position. In order for the block 46 and chuck 42 to move to the disengaged position, the force of the spring 48 must be overcome as will be described.

Figure 2:
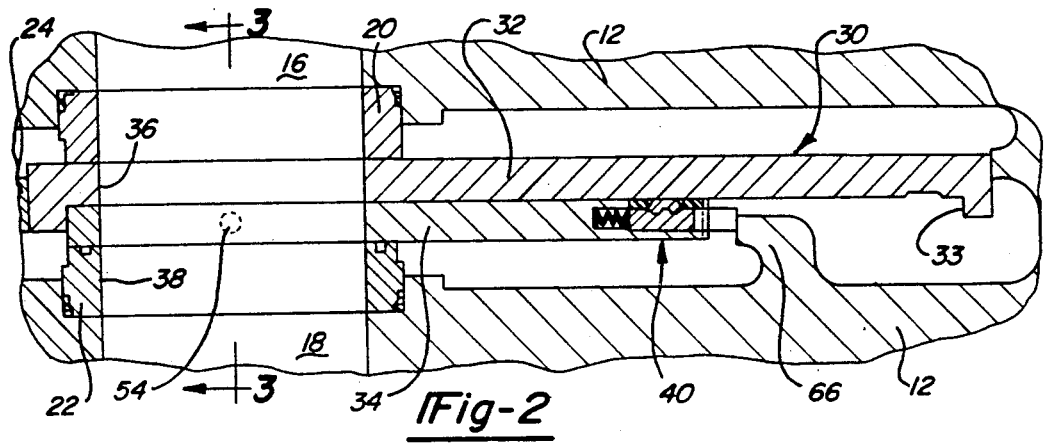
FIG. 2 is a cross-sectional perspective of the gates in the full-open position.
Figure 3:
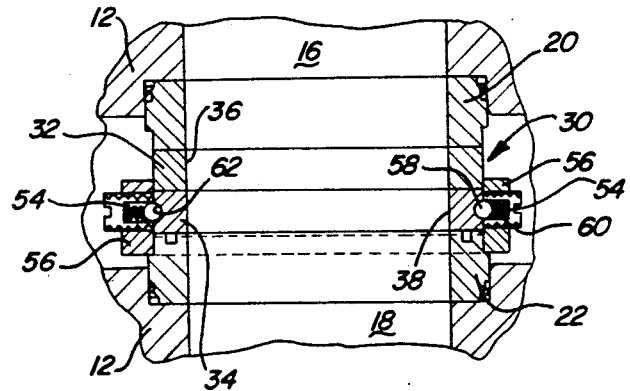
FIG. 3 is a cross-sectional perspective of the gates in the open position taken along lines 3—3 of FIG. 2.
Figure 4:
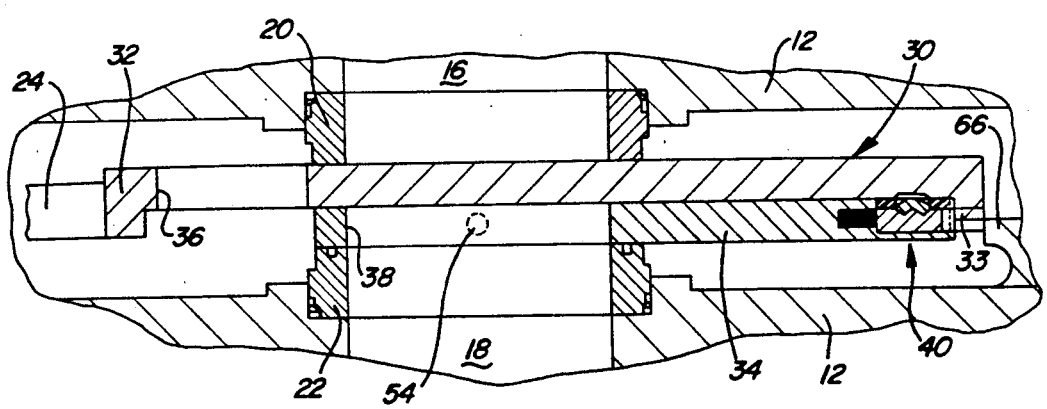
FIG. 4 is a cross-sectional perspective of the gates in the half-open position.
Figure 5:
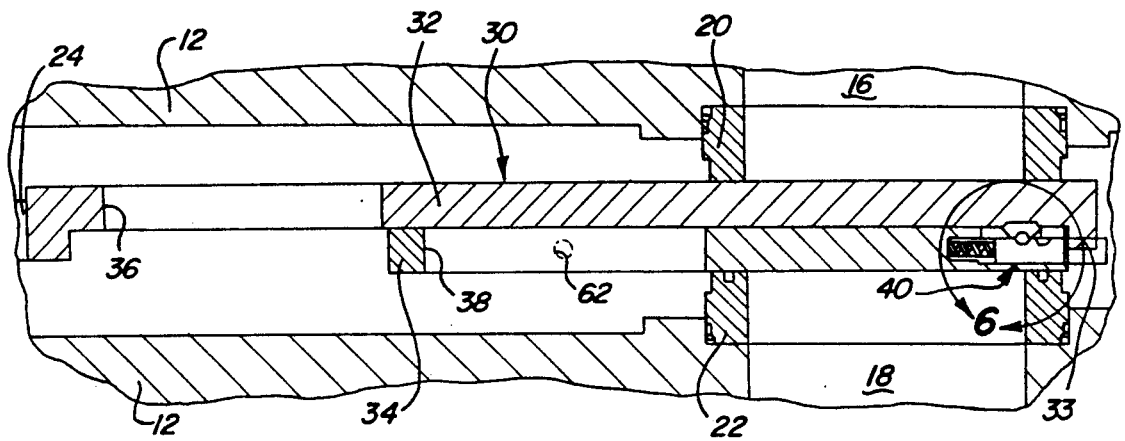
FIG. 5 is a cross-sectional perspective of the gates in the full-closed position.

In order to retard movement of the follower gate 34 from the full open position (FIG. 2) towards the closed position (FIG. 5) until the interlock mechanism 40 is engaged, opposing ball detents 54 are provided in association with the follower gate 34. A combination gate guide and detent carrier 56 is mounted within the housing 12 within which the detents 54 are threadably received. The detents 54 include balls 58 which are biased by springs 60 against the follower gate 34. A dimple 62 formed in the follower gate 34 receives the ball 58 of the detent 54 in the full open position as shown in FIG. 3.

Operation of the gate valve 10 of the present invention provides a positive means for controlling fluid flow through a pipeline while also shielding the downstream seal 22 from the erosive forces of the fluid flow. The gate valve 10 is shown in FIGS. 2 and 3 in the "full" open position allowing the flow of fluid through the pipeline. Both bores 36 and 38 of the gates 32 and 34 are in axial alignment with the passageways 16 and 18. When it becomes necessary to close the gate valve 10, the crank 26 is used to draw the lead gate 32 bringing the bore 36 out of alignment with the passageways. The follower gate 34 is prevented from shifting by the ball detents 54 thereby covering the downstream seal 22 even as the fluid passageway narrows and the force of the fluid increases. As the gate assembly 30 moves to the half-open position shown in FIG. 4, fluid flow will be interrupted although not completely sealed-off since the majority of sealing is conducted by the resilient downstream seals. As the lead gate 32 reaches the "half"-open position, a flange 33 will engage the follower gate 34 to pull the follower gate 34. Simultaneously, the follower gate 34 and the interlock mechanism 40 are withdrawn from a fixed stop 66 formed in the housing 12 which allows the block 46 of the interlock 40 to shift under the force of the spring 48 thereby driving the chuck 42 against the lead gate 32 as shown in FIG. 6. The lead gate 32 will continue to draw the follower gate 34 until the gate assembly 30 reaches the full closed position shown in FIG. 5 with both bores 36 and 38 out of registry with the fluid passageways 16 and 18.

The sequence of operation is essentially reversed in order to open the gate valve 10. As the lead gate 32 is pushed towards the open position, the interlock mechanism 40 will maintain interconnection allowing the follower gate 34 to move with the lead gate 32. As the gate assembly 30 reaches the "half" open position in FIG. 4, the stop 66 will contact the block 46 of the interlock 40 driving it against the force of the spring 48 and allowing the chuck 42 to fall into grooves 50 disengaging the interlock 40. Further movement of the follower gate 34 will be prevented, leaving seal 22 once again shielded as fluid flow is initiated. As the lead gate 32 continues to move, the passageway through the gate valve 10 will be opened until the gate assembly 30 moves to the "full" open position shown in FIG. 2. In accordance with the invention, fluid flow through the gate valve 10 will be accurately controlled while the useful life of the downstream seals 22 will be lengthened as a result of the shielding properties of the gate assembly 30.

The foregoing detailed description has been given for clearness of understanding only and no unnecessary limitations should be understood therefrom as some modifications will be obvious to those skilled in the art without departing from the scope and spirit of the appended claims.

What is claimed is:

1. A gate valve for selectively controlling fluid flow through a pipeline comprising:
   a valve housing with an inlet fluid passageway and an outlet fluid passageway;
   a gate assembly intermediate said inlet fluid passageway and said outlet fluid passageway for selectively interrupting fluid flow from said inlet to said outlet, said gate assembly including at least two interconnected gates mounted along a common plane for sequential linear movement along said common plane, said at least two interconnected gates linearly sequentially movable within said housing to selectively control fluid flow from said inlet fluid passageway to said outlet fluid passageway; and
   means for manipulating said gate assembly within said housing to selectively control fluid flow.

2. The gate valve as defined in claim 1 and further comprising seals seated within said fluid passageways in sealing engagement with said gate assembly.

3. The gate valve as defined in claim 2 wherein said gate assembly includes a lead gate and a follower gate each having a fluid bore therethrough alignable with said fluid passageways, said gates selectively interconnected for simultaneous movement by an interlock mechanism, said interlock mechanism disengaging to permit independent movement of said lead gate relative to said follower gate when said bore of said follower gate aligns with said fluid passageways.

4. The gate valve as defined in claim 3 wherein said housing includes a fixed stop to disengage said interlock mechanism for independent movement of said lead gate.

5. The gate valve as define in claim 4 wherein said interlock mechanism is disposed within said follower gate, said interlock mechanism includes a retractable chuck selectively engaging said lead gate for simultaneous movement and a spring-biased block for driving said chuck against said lead gate.

6. The gate valve as defined in claim 5 wherein said lead gate includes at least one groove for receiving said chuck of said interlock mechanism for simultaneous movement of said gates.

7. The gate valve as defined in claim 5 and further comprising ball detents engaging said follower gate, said ball detents preventing movement of said follower gate as said lead gate moves independently thereof.

8. The gate valve as defined in claim 3 wherein said lead gate is connected to said manipulating means.

9. The gate valve as defined in claim 3 wherein said outlet passageway includes a downstream seal seated therein, said downstream seal engaging said follower gate whereby said follower gate shields said downstream seal against the fluid flow through said gate valve.

10. A gate valve for selectively controlling fluid flow through a pipeline comprising:
- a valve housing with inlet and outlet fluid passageways having flanges for connection within the pipeline, said inlet and outlet fluid passageways including seals seated therein;
- a gate assembly movably disposed within said valve housing intermediate said inlet fluid passageway and said outlet fluid passageway in sealing contact with said seals for selectively interrupting fluid flow from said inlet to said outlet, said gate assembly including a lead gate and a follower gate mounted in flush contact along said common plane, said lead gate and follower gate interconnected for sequential linear movement within said housing to selectively control fluid flow from said inlet fluid passageway to said outlet fluid passageway; and
- means for manipulating said gate assembly within said housing to selectively control fluid flow, said means connected to said lead gate.

11. The gate valve as defined in claim 10 wherein said lead gate and said follower gate include fluid bores alignable with said fluid passageways, said gates selectively interconnected for simultaneous movement by an interlock mechanism, said interlock mechanism disengaging to permit movement of said lead gate independent of said follower gate when said bore of said follower gate aligns with said fluid passageways of said housing.

12. The gate valve as defined in claim 11 wherein said interlock mechanism is disposed within said follower gate, said interlock mechanism includes a retractable chuck selectively engaging said lead gate for simultaneous movement and a spring-biased block for driving said chuck against said lead gate.

13. The gate valve as defined in claim 12 wherein said housing includes a fixed stop, said spring-biased block of said interlock mechanism engaging said stop to disengage said interlock mechanism for independent movement of said lead gate relative to said follower gate.

14. The gate valve as defined in claim 13 and further comprising ball detents mounted in said housing for engagement with said follower gate, said ball detents preventing movement of said follower gate as said lead gate moves independently thereof.

15. In a gate valve including a valve housing having axially aligned inlet and outlet fluid passageways for connection within a fluid pipeline, a gate assembly movably disposed within the housing intermediate the inlet and outlet fluid passageways and sealingly engaging seals seated within said fluid passageways, and means for manipulating the gate assembly to selectively control fluid flow through the gate valve and the fluid pipeline, the improvement comprising:
said gate assembly including a lead gate connected to said manipulating means, a follower gate in flush engagement with said lead gate, and an interlock mechanism selectively interconnecting said lead and follower gates, said interlock mechanism mounted within one of said follower and lead gates and including a retractable chuck selectively engaging another of said follower and lead gates for simultaneous movement and a spring-biased block for driving said chuck against said other of said follower and lead gates, said lead and follower gates including throughbores selectively alignable with the inlet and outlet passageways, said gate assembly selectively movable between a first open position with said throughbores of said lead and follower gates aligned with the passageways and said interlock mechanism disengaged, a second position with said throughbore of said lead gate out of alignment with the passageway whereupon said interlock mechanism engages, and a third closed position with throughbores of both said lead and follower gates out of alignment with the passageways to prevent fluid flow through the gate valve, whereby said follower gate shields a downstream seal of the outlets fluid passageways from the fluid flow through the gate valve.

16. The gate valve as defined in claim 15 and further comprising ball detents mounted in said housing for engagement with said follower gate, said ball detents preventing movement of said follower gate until said interlock mechanism is engaged.

17. A gate valve for selectively controlling fluid flow through a pipeline comprising:
- a valve housing with an inlet fluid passageway and an outlet fluid passageway;
- a gate assembly intermediate said inlet fluid passageway and said outlet fluid passageway for selectively interrupting fluid flow from said inlet to said outlet, said gate assembly including a lead gate and a follower gate interconnected for sequential linear movement within said housing to selectively control fluid flow, said gates selectively interconnected for simultaneous linear movement by an interlock mechanism disposed within said follower gate, said interlock mechanism including a retractable chuck selectively engaging said lead gate for simultaneous movement and a spring-biased block for driving said chuck against said lead gate; and
- means for manipulating said gate assembly within said housing to selectively control fluid flow.

18. The gate valve as defined in claim 17 wherein said housing includes a fixed stop to disengage said interlock mechanism for independent movement of said lead gate relative to said follower gate.

19. The gate valve as defined in claim 17 wherein said lead gate is connected to said manipulating means.

20. The gate valve as defined in claim 18 and further comprising ball detents engaging said follower gate, said ball detents preventing movement of said follower gate as said lead gate moves independently thereof.

* * * * *